United States Patent Office 3,644,594
Patented Feb. 22, 1972

3,644,594
POLYVINYL ACETAL INTERLAYERS CONTAINING COPOLYMERIC ADDITIVES
George E. Mont and Saul M. Cohen, Springfield, Mass., assignors to Monsanto Company, St. Louis, Mo.
No Drawing. Filed Apr. 22, 1969, Ser. No. 818,403
Int. Cl. C08f 29/50
U.S. Cl. 260—901    8 Claims

ABSTRACT OF THE DISCLOSURE

Disclosed herein are polyvinyl acetal interlayers having improved impact strength which contain from 0.5 to 5.0 parts per hundred parts of polyvinyl acetal resin (phr.) of an additive which is the copolymerization product of at least one vinyl ester and at least one ester of acrylic methacrylic acid.

BACKGROUND OF THE INVENTION (1) Field of the invention

The present invention relates to interlayer material for laminated glazing units. More particularly, the present invention relates to polyvinyl acetal interlayers having improved impact strength and to laminated glazing units prepared from these interlayers.

(2) Description of the prior art

Plasticized polyvinyl acetals, especially polyvinyl butyral, have been used for years as interlayers in laminated structures for use in windshields of vehicles and aircraft, structural members in building construction, glass doors, decorative partitions, table tops, etc. Such interlayers must have high impact strength in order to resist blows from moving objects. In glass laminates the interlayer should have sufficient adhesion to the glass members of the laminate so as to minimize the danger from flying glass after impact. In uses where there is a danger of a person striking the laminate e.g. walking into glass doors and partitions hitting the windshield after the vehicle comes to a sudden stop, etc., the interlayer also serves to minimize the hazard of the person penetrating the laminate as well as of being cut by flying glass.

Polyvinyl butyral alone is not suitable for use as an interlayer in glass laminates and must be plasticized in order to achieve suitable properties such as flexibility, elongation and adhesion to glass.

However, a problem arises with the use of plasticizers. Plasticizers cause a decrease in impact strength and tensile strength in the interlayer and in the impact strength of the resulting laminates, especially at higher temperatures. A definite need exists for a plasticized polyvinyl butyral sheet which has improved impact strength over a broader temperature range. These uses would include automobile windshields, where the temperature can rise to 140° F. during summer months; or architectural uses, where the laminate is exposed to strong sunlight and heat.

SUMMARY OF THE INVENTION

This invention provides a solution to the problem of improving the impact strength of polyvinyl acetal interlayers at elevated temperatures, i.e., temperatures in the range of from 110° F. to 140° F. Polyvinyl acetal interlayers prepared in accordance with the teaching of the present invention show increased impact strength in this range and provide means for preparing safer laminates. This improved impact strength which is obtained at elevated temperatures is totally unexpected because the polymeric additives used are very soft polymers with relatively low glass transition temperatures. Consequently, these materials alone soften easily and flow readily at elevated temperatures.

The improvement in the impact strength of polyvinyl acetal interlayer material has been accomplished by incorporating into the polyvinyl acetal from 0.5 to 5.0 parts per hundred parts of polyvinyl acetal resin (phr.) of a polymeric additive which is the polymerization reaction product of at least one vinyl ester and at least one ester of acrylic or methacrylic acid.

DESCRIPTION OF THE PREFERRED EMBODIMENTS

The polyvinyl acetal resins which are employed in the present invention may be made from various unsubstituted aldehydes containing an active carbonyl group or from mixtures of unsubstituted aldehydes and ketones. Thus formaldehyde, acetaldehyde, propionaldehyde, butyraldehyde, valeraldehyde, hexaldehyde, benzaldehyde, crotonaldehyde, cyclohexanone and the like and mixtures thereof may be utilized. In general, the acetal resin is made by reacting an aldehyde with hydrolyzed polyvinyl ester wherein the carboxylic moiety is derived from an aliphatic acid of from 1 to 8 carbon atoms such as formate, acetate, propionate, butyrate, 2-ethylhexylate, etc., in the presence of a solvent for the product and precipitating the resin product with water. Alternate methods might include carrying out the reaction in the presence of a non-solvent dispersing medium such as water or a non-solvent mixture of water and solvent, e.g., a water-ethanol mixture. More detailed methods for preparing such resins are set forth in Morrison et al. Pat. No. Re. 20,430, dated June 29, 1937, and Lavin et al. U.S. Pat. No. 2,496,480. In general, polyvinyl acetal resins made from saturated lower unsubstituted aliphatic aldehydes are the most suitable. These would include polyvinyl acetal resins made from unsubstituted saturated aliphatic aldehydes containing less than 6 carbon atoms such as propionaldehyde, valeraldehyde and especially those made from formaldehyde, acetaldehyde, butyraldehyde and mixtures thereof. Particularly preferred are polyvinyl acetal resins made from butyraldehyde.

In general the polyvinyl acetal resins employed have Staudinger molecular weights ranging from about 50,000 to 600,000 and preferably from 150,000 to 270,000 and may be considered to be made up, on a weight basis, of from 9 to 25% hydroxyl groups, calculated as polyvinyl alcohol; 0 to 40% ester, and preferably acetate groups, calculated as polyvinyl ester, e.g., acetate; and the balance substantially acetal. When the acetal is butyraldehyde acetal, the polyvinyl acetal resin will preferably contain, on a weight basis, from 9 to 30% hydroxyl groups, calculated as polyvinyl alcohol; and from 0 to 3% ester, e.g., acetate, groups, calculated as polyvinyl ester; the balance being substantially butyraldehyde acetal.

The polymeric additives which are incorporated into polyvinyl acetal interlayers according to the teaching of the present invention are prepared from at least one vinyl ester and at least one ester of acrylic or methacrylic acid wherein the pendent moiety of each of the ester coreactants contains from 1 to 10 carbon atoms. The amount of the vinyl ester component used is in the range of from 25 to 85% by weight based on the total weight of the polymer additive.

Examples of suitable vinyl esters that are used to prepare the polymeric additives used in the present invention include vinyl formate, vinyl acetate, vinyl propionate, vinyl butyrate, vinyl octanoate, vinyl benzoate, etc. The preferred vinyl ester is vinyl acetate.

Examples of suitable esters of acrylic and methacrylic acid which are copolymerized with the vinyl esters listed above would include methyl acrylate, ethyl acrylate, propyl acrylate, butyl acrylate, pentyl acrylate, hexyl acrylate, 2-ethylhexyl acrylate, nonyl acrylate, decyl acrylate, methyl methacrylate, ethyl methacrylate, propyl methacrylate, butyl methacrylate, pentyl methacrylate, hexyl methacrylate, 2-ethyl hexyl methacrylate, nonyl methacrylate, decyl methacrylate, etc.

Optionally, the polymeric additives may be further modified by interpolymerizing other monomers with the vinyl ester and acrylic ester. Preferably, these other monomers contain a functional group selected from the group consisting of carboxylic acid, amide, hydroxyl and glycidyl. Examples of these comonomers would include carboxylic monomers such acrylic, methacrylic, crotonic and itaconic acids, etc.; amides such as acrylamide, methacrylamide; hydroxyl containing monomers selected from the group consisting of hydroxy alkyl acrylates, hydroxyalkyl methacrylates, hydroxy alkyl fumarates and hydroxy alkyl maleates wherein the alkyl group contains from 2 to 4 carbon atoms; and glycidyl containing monomers such as glycidyl acrylate and glycidyl methacrylate, etc. The preferred polymers are those which are prepared from vinyl acetate and esters of acrylic acids wherein the alcohol moiety of the ester contains from 1 to 8 carbon atoms.

The polymeric additives are further characterized as having an intrinsic viscosity of from 0.1 to 7.0 dl./g. and more preferably of from 0.4 to 2.5 dl./g. as measured in benzene at 20° C.

Preferably, the polymeric additive is also soluble in the particular plasticizer used for the polyvinyl acetal. Heat may be used if necessary to effect solution. For maximum transparency in the final laminate, the polymeric additive should dissolve completely in the plasticizer. The plasticizers which are used in the practice of this invention are esters and/or ethers of an alcohol which contains at least one hydroxyl group and of an acid which contains at least one carboxyl group. Among the suitable plasticizers are triethylene glycol di(2-ethyl butyrate); triethylene glycol dihexanoate; glyceryl mono-oleate; di-(butoxyethyl)adipate; dialkyl phthalates; i.e., dioctyl phthalate; dibutoxy ethyl phthalate; dibutyl Cellosolve adipate; butyl ricinoleate; alkyl laurates; dibutyl diglycolate; diamyl phthalate; mono- and dialkyl succinates; triethylene glycol dibutyrate; tributyl citrate; triaryl phosphates; butoxy-ethoxy ethyl butyrate; diethoxy ethyl phthalate; triethylene glycol dipropionate; diethylene glycol dipropionate; benzoxyethoxy ethyl propionate; mono- and dialkyl sebacates; butyl benzoate; diglycerol tetraacetate; dialkoxy alkyl sebacic acid esters; di(polyglycol monoether) esters of sebacic acid; di(monoethyl ether of diethylene glycol) sebacate; di(monobutyl ether of diethylene glycol) sebacate; di(tetrahydrofurfuryl) sebacate; tetrahydrofurfuryl oxalate; tetrahydrofurfuryl tetrahydrofuroate; glyceryl alpha-gamma dialkyl ethers; dialkyl esters of diglycolic and thiodiglycolic acids; aryl esters of higher aliphatic acids such as phenyl oleate, phenyl abietate, etc. When desired, mixtures of these and other types of plasticizers may also be included in the compositions, examples of which are well known to those skilled in the art.

The preferred plasticizers are triethylene glycol di(2-ethyl butyrate), dibutyl sebacate, and di(beta-butoxyethyl)adipate. The polyvinyl acetal is plasticized to the extent of about 20 to 80 parts plasticizer per 100 parts resin and more commonly between 40 and 60 parts for normal glass laminate use. This latter concentration is generally used with polyvinyl butyrals containing 18 to 23% vinyl alcohol by weight.

Test specimens are prepared by dissolving, using heat if necessary, from 0.5 to 5.0 parts of the polymeric additive into the plasticizer for the polyvinyl acetal. The polyvinyl acetal is then slurried in the plasticizer solution. The slurry is then intimately mixed in a Brabender Plastograph at a temperature of 150° C. and 50 r.p.m. for 7 minutes.

The plasticized polyvinyl acetal interlayer is then pressed into films using a temperature of 300° F. to 600 p.s.i. for 5 minutes. Shims are used to adjust the film thickness in the range of from 15 to 45 mils (i.e. from 0.015 to 0.045 inch).

The films are conditioned at various temperatures prior to testing. Those films which are to be tested at 73° F. and 120° F. are conditioned at 73° F. and 50% relative humidity for 24 hours. Those films which are to be tested at 0° F. are conditioned at 0°F. and low ambient relative humidity (<30% RH) for 24 hours.

The films are tested for impact strength at the specified test temperatures according to the method described in the article, "A Versatile Plastic Sheet Impact Tester" by Cohen et al. which is published in ASTM Materials and Standards Journal, vol. 9, issue 5, May 1969 at page 21.

A flat headed cylindrical punch having a diameter of 0.289" is used. The impact strength is reported in terms of the Mean Penetration Energy in inch-pounds required to penetrate the interlayer, which is defined for both impacted area and thickness.

The following examples are given in illustration of this invention. Unless otherwise indicated, all parts and percentages are by weight.

Example 1 (control).—This example is set forth as a control to illustrate the impact strength that is obtained in the interlayers of the prior art. One hundred (100) parts of a polyvinyl butyral resin, having a molecular weight in the range of from 180,000 to 270,000, a residual hydroxyl content in the range of from 17.5 to 22.5% by weight and less than 3% residual vinyl acetate groups is slurried into 42 parts of a triethylene glycol di(2-ethyl butyrate) plasticizer. The material is intimately blended in a Brabender and pressed into sheets of varying thicknesses.

The sheets are then tested for impact strength at a temperature of 120° F.

The data in the following Table I illustrates the Mean Penetration Energy values for the plasticized butyral film control samples, which do not contain a polymeric additive in accordance with the practice of the present invention.

TABLE I.—CONTROL DATA
[Impact values for mean penetration energy at 120° F.]

| Example: | Film thickness (mils) | Impact strength (inch-pounds) |
|---|---|---|
| 1A | 15 | 21.0 |
| 1B | 20 | 31.5 |
| 1C | 25 | 43.5 |
| 1D | 30 | 56.5 |

The following Examples 2 to 5 illustrate the use of a polymeric additive in order to improve the impact strength of polyvinyl acetal interlayer. In order to facilitate comparison of these examples, each example uses the same polyvinyl butyral resin and the same plasticizer as was used in Example 1. In these examples 2.1 parts of polymeric additive is dissolved in 39.9 parts of plasticizer which is then blended with 100 parts of resin.

The plasticized resin is then formed into films and tested for impact strength at 120° F. The composition of the polymeric additive and the results of the impact strength tests are tabulated in the following Table II.

TABLE II

[Summary of Examples 2 to 5]

| Ex. | Copolymeric additive [1] | Intrinsic viscosity [2] | Film thickness (mils) | 120° F. impact strength,[3] (inch-pounds) |
|---|---|---|---|---|
| 2 | VOAC/EHA, 35/65 | 0.8 | 18.7 | 55.7 |
| 3 | VOAC/EHA, 50/50 | 0.8 | 19.0 | 59.8 |
| 4 | VOAC/EHA/BA, 30/34.5/34.5 | 1.0 | 22.5 | 99.5 |
| 5 | VOAC/EHA/HEA, 30/67/2.5 | 1.2 | 17.5 | 48.5 |

[1] Indicates the monomers used and parts by weight of each which are used to prepare polymeric additives.
[2] Intrinsic viscosity in terms of dl./g. measured in benzene at 20° C.
[3] Impact strength=impact values for mean penetration energy in inch-pounds required to penetrate test sample at 120° F.
BA=butyl acrylate; EHA=2-ethyl hexyl acrylate; HEA=hydroxy ethyl acrylate; VOAC=vinyl acetate.

A comparison of the impact strength values for the interlayer of Examples 2 to 5 and Control Examples 1A to 1D clearly shows the significant improvement in impact strength that is achieved in the practice of this invention.

Note that with the Control Examples an impact value of over 50 inch-pounds is not obtained with interlayers having a film thickness of less than 30 mils. However, in Examples 2 to 4, impact strength values well over 50 inch-pounds are obtained with interlayers having thicknesses of from 18.7 to 22.5 mils, respectively.

Note that the 22.5 mil interlayer of Example 4 has an impact strength approximately 2½ times the impact strength for the control interlayers of comparable thickness.

The following examples are set forth to illustrate that the improved impact strength obtained with the interlayers of the present invention is not accomplished at the expense of the impact strength at lower temperatures.

Test samples are prepared from the control resin of Example 1 and from the formulated resins used in Examples 2 and 3. These materials are then conditioned and tested at 0° F. and 73° F. Results of these tests are tabulated in the following Table III.

TABLE III

[Summary of impact test results at 0° F. and 73° F.]

| | | 0° F. | | 73° F. | |
|---|---|---|---|---|---|
| Type | Example | Film thickness [1] | Impact strength [2] | Film thickness [1] | Impact strength [2] |
| Control | 1A | 15.0 | 6.8 | 15.0 | 23.6 |
| Do | 1B | 20.0 | 10.4 | 20.0 | 31.0 |
| Do | 1C | 25.0 | 14.4 | 25.0 | 38.0 |
| Do | 1D | 30.0 | 18.8 | 30.0 | 45.0 |
| Test sample | 2 | 15.6 | 6.6 | 18.0 | 31.5 |
| Do | 3 | 16.0 | 6.6 | 18.0 | 30.5 |

[1] Film thickness given in mils.
[2] Impact strength given in terms of mean penetration energy in inch-pounds required to penetrate test sample.

The data in the foregoing Table 3 illustrate that the significant increase in impact strength at 120° F. which is achieved with interlayers prepared according to the present invention is not made at the expense of impact strength of these interlayers at lower temperatures.

Note the test results at 0° F. These show that the interlayer material of Examples 2 and 3 have an impact strength comparable to Control Example 1A.

Note the results at 73° F. The 18 mil interlayers used in Examples 2 and 3 have an impact strength which is comparable to the 20 mil interlayer in Control Example 1B.

Thus, the significant increase in impact strength at 120° F. is a real gain in interlayer strength and not merely an upward displacement of the curve which is obtained by plotting impact strength against temperature.

Example 6.—This example illustrates the use of a different polyvinyl acetal. Example 2 is repeated here except that a plasticized polyvinyl formal sheet is used in place of the polyvinyl butyral sheet used in Example 7. The polyvinyl formal has a hydroxyl content of about 5.7, a residual acetate content of 12.4% and a molecular weight of about 38,500. The impact strength of this interlayer is comparable to that obtained in Example 2.

Example 7.—This example illustrates the use of a different plasticizer. Example 5 is repeated here except that di(butyoxethyl)adipate is substituted for the triethylene glycol di(-2-ethyl butyrate) used in Example 5. Comparable impact strengths are obtained.

Example 8.—Example 4 is repeated here except that the amount of polymeric additive is reduced to 0.75 part while the amount of plasticizer is increased to 60 parts. A 16.5 mil interlayer is found to have an impact strength at 120° F. which is substantially superior to a control sample which does not contain a polymeric additive.

The following Examples 9 and 10 are set forth as additional controls to illustrate the impact strength of interlayers which contain 40 and 39.2 parts of plasticizer per hundred parts of resin but which do not contain a polymeric additive in accordance with the teachings of the present invention.

Example 9.—Example 1 is repeated here except that the amount of the triethylene glycol di(2-ethyl butyrate) plasticizer is reduced to 40 parts. The impact strength values for this material is reported in Table IV below.

Example 10.—Example 1 is repeated here except that the amount of the triethylene glycol di(2-ethyl butyrate) plasticizer is reduced to 39.2 parts. The impact strength values for this material is reported in Table IV below.

TABLE IV

[Impact strength values for control Examples 9 and 10]

| | Test temperature (° F.) | Film thickness [1] | Impact strength [2] |
|---|---|---|---|
| Example: | | | |
| 9 | 0 | 26.8 | 13.1 |
| 9 | 73 | 16.5 | 31.0 |
| 9 | 120 | 16.5 | 22.3 |
| 10 | 0 | 21.8 | 10.0 |
| 10 | 73 | 23.0 | 46.6 |
| 10 | 120 | 19.5 | 30.5 |

[1] Film thickness given in mils.
[2] A comparison of these values with those given in Tables II and III will show that the superior impact strength which is obtained at 120° F. with the interlayers of the present invention is indeed significant and not due to slight variations in the amount of plasticizer used.

The following Table V is set forth to illustrate the wide variations that are possible in the compositions of the polymeric additives used in the present invention. These additives are conveniently prepared by conventional polymerization techniques such as mass, suspension, emulsion or solution polymerization techniques. The polymers listed in Table V as well as those used in the foregoing examples are prepared by solution polymerization.

TABLE V.—POLYMERIC ADDITIVES

| Composition [1] | Parts by weight | Intrinsic viscosity [2] |
|---|---|---|
| VOAC/EHA/AA | 75/23/2 | 2.3 |
| VOAC/EHA/GMA/AA | 47/50/2/1 | 1.9 |
| VOAC/BA/AM | 50/45/5 | 0.6 |
| VOAC/BA/EA | 403/03/0 | 1.4 |

[1] Monomers used to prepare polymer.
[2] Intrinsic viscosity in terms of dl./g. measured in benzene at 20° C.
AA= acrylic acid; AM=acrylamide; BA=butyl acrylate; EA=ethyl acrylate; GMA=glycidyl methacrylate; VOAC=vinyl acetate.

Example 11.—A glass laminate is prepared by interposing a 30 mil interlayer of the type prepared in Example 4 between two sheets of glass and then subjecting the assembly to heat and pressure. The impact strength of this laminate is found to be superior to that of a control laminate prepared from an interlayer which did not contain a polymeric additive in accordance with the teachings of the present invention.

The improved interlayers of the present invention vary in thickness from 5 to 500 mils depending on the particular applications in which they are used. In general thicknesses of from 10 to 60 mils are preferred for laminates which are to be used as glazing units in vehicles or in architectural applications.

Pellucid laminates are prepared using glass or some other rigid pellucid material. Examples of other pellucid materials would include sheets of polymethylmethacrylate, polycarbonate, polyvinyl chloride, polystyrene, cellulose acetate, cellulose butyrate, polyacrylonitrile, etc.

Also contemplated for use in the interlayers of the present invention are conventional additives such as inks, dyes, pigments, antioxidants and other processing aids.

It is obvious that many variations may be made in the products and processes set forth above without departing from the spirit and scope of this invention.

What is claimed is:

1. A plasticized polyvinyl acetal interlayer which contains from 0.5 to 5.0 parts, per hundred parts of polyvinyl acetal resin, of a polymeric additive which is the interpolymerization reaction product of vinyl acetate, an acrylic acid ester wherein the alcohol moiety of the acrylic acid ester contains from 1 to 10 carbon atoms and at least one other interpolymerizable monomer which contains a functional group selected from the group consisting of carboxylic acid, hydroxyl, amide and glycidyl groups.

2. An interlayer as in claim 1 wherein the amount of vinyl acetate in the polymeric additive is in the range of from 25 to 85% by weight based on the total weight of the polymeric additive.

3. An interlayer as in claim 1 wherein the alcohol moiety of the acrylic acid ester contains from 1 to 8 carbon atoms.

4. An interlayer as in claim 1 wherein the polyvinyl acetal is polyvinyl butyral.

5. A plasticized polyvinyl butyral interlayer as in claim 4 wherein the polymeric additive is the interpolymerization product of vinyl acetate, 2-ethyl hexyl acrylate and hydroxyethyl acrylate.

6. A plasticized polyvinyl butyral interlayer which contains from 0.5 to 5.0 parts, per hundred parts of polyvinyl butyral resin, of a polymeric additive which is the interpolymerization reaction product of vinyl acetate, an acrylic acid ester and at least one other interpolymerizable monomer which contains a functional group selected from the group consisting of carboxylic acid, hydroxyl, amide and glycidyl groups wherein the amount of vinyl acetate in the polymeric additive is in the range of from 25 to 85% by weight based on the total weight of the polymeric additive; and wherein the alcohol moiety of the acrylic acid ester contains from 1 to 8 carbon atoms.

7. A plasticized polyvinyl butyral interlayer as in claim 6 wherein the polymeric additive is the interpolymerization product of vinyl acetate, 2-ethyl hexyl acrylate and hydroxyethyl acrylate.

8. A plasticized polyvinyl acetal interlayer which contains from 0.5 to 5.0 parts, per hundred parts of polyvinyl acetal resin, of a polymeric additive which is the interpolymerization reaction product of vinyl acetate, 2-ethyl hexyl acrylate and hydroxyethyl acrylate; wherein the amount of vinyl acetate in the polymeric additive is in the range of from 25 to 85 % by weight based on the total weight of the polymeric additive.

References Cited

UNITED STATES PATENTS

| 2,326,543 | 8/1943 | Macht | 260—901 |
| 3,505,160 | 4/1970 | Michaels et al. | 161—147 |

FOREIGN PATENTS

| 725,405 | 3/1955 | Great Britain | 260—901 |

PAUL LIEBERMAN, Primary Examiner

J. SEIBERT, Assistant Examiner

U.S. Cl. X.R.

161—199; 260—23 AC, 23 AR, 30.6 R, 31.4 R, 31.6, 31.8 M, 32.2, 33.2 R, 78.5, 836